Oct. 20, 1959     A. E. CUTLER     2,909,722
ELECTRICAL APPARATUS FOR GENERATING NON-LINEAR FUNCTIONS
Filed Nov. 24, 1954

INVENTOR
ALBERT E. CUTLER
BY Watson, Cole, Grindle & Watson
ATTORNEYS

United States Patent Office 2,909,722
Patented Oct. 20, 1959

2,909,722

ELECTRICAL APPARATUS FOR GENERATING NON-LINEAR FUNCTIONS

Albert Ernest Cutler, Crawley, England, assignor to Communications Patents Limited, London, England Application November 24, 1954, Serial No. 471,037

Claims priority, application Great Britain December 2, 1953

5 Claims. (Cl. 323—74)

This invention relates to electrical apparatus for obtaining an electric quantity which varies as a function of a mechanically-represented variable.

One device which has been used to generate voltage functions is the contoured potentiometer. This usually consists of a strip or drum of insulating material, the width of which varies as the differential coefficient of the required function and which is overwound with resistance wire. A wiper is given a position on this potentiometer corresponding to the value of the variable and is adjusted in accordance with variation of the latter. The contoured potentiometer has the disadvantages that a given function must first be differentiated, then a strip must be cut to the appropriate contour and finally the contoured strip must be wound with resistance wire. In practice, some refinements of this method are necessary in order to avoid slopes that are too steep for convenient winding, and to allow for the effect of loads.

It has also been proposed to provide a potentiometer with a number of tappings to which there are applied potentials corresponding respectively to the ordinates of points on the curve of the function which it is desired to generate. In this way, an output function would be obtained at the wiper of the potentiometer which would consist of a number of straight-line approximations to different portions of the curve. A disadvantage of this method would be that if it were desired to effect a modification in the form of the function generated, it would be necessary to adjust the potentials applied to a number of tappings, as a change in the potential applied to one tapping would affect the potentials at the others.

It is an object of the present invention to provide apparatus for obtaining an electric quantity which can be made to vary approximately in accordance with a desired function of a variable, the apparatus being such that the calculation of the initial conditions which will provide a particular output function is simple and that if a modification of the output function becomes desirable, the modification of these conditions is easily calculated and carried out.

In order that the invention may be better understood, a preferred form of the invention will now be described, by way of example only, with reference to the accompanying drawings, in which.

Figure 1:
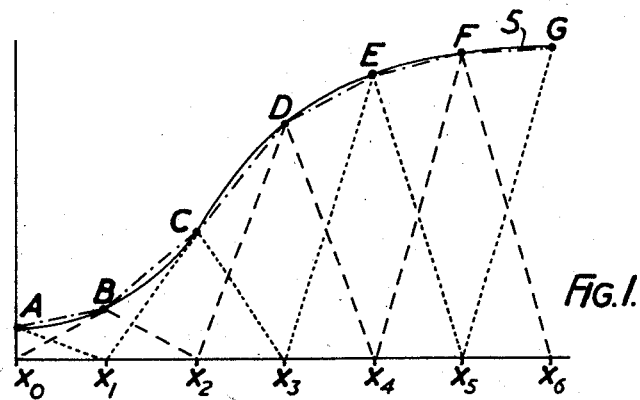
Fig. 1 is a graph of the function to be approximated, and the output function which is actually generated.
Figure 2:
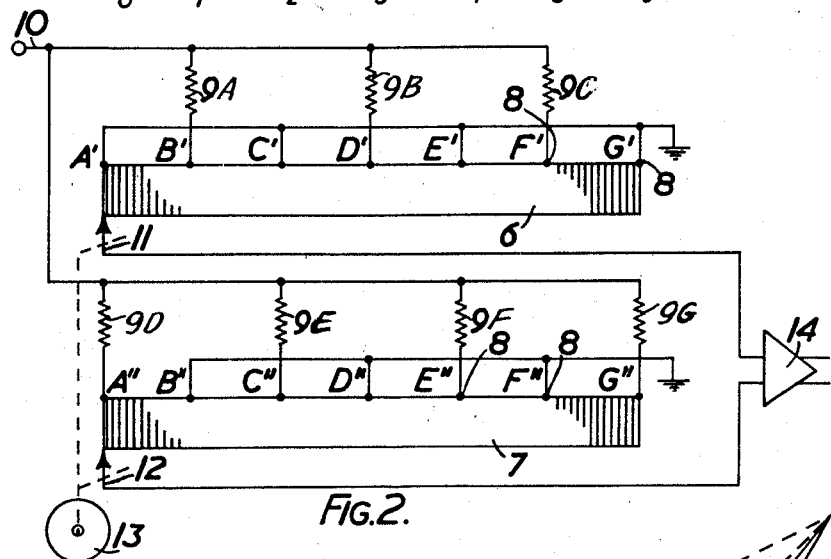
Fig. 2 shows apparatus according to the invention for generating the output function shown in Figure 1.

In Figure 1, the curve 5 represents the function to be generated. This curve is divided into six sections AB, BC . . . FG corresponding to the equal intervals $x_0 x_1$, $x_1 x_2$ . . . $x_5 x_6$ along the x-axis. In Figure 2, two linear potentiometers 6 and 7, for example, two uniformly-wound resistive potentiometers, are each provided with end and tapping contacts such as the contacts 8 which divide each potentiometer unit into six equal sections, $A'B'$, $B'C'$ . . . and $A''B''$, $B''C''$ . . . respectively. These potentiometer sections form a series of pairs $A'B'$—$A''B''$, $B'C'$—$B''C''$, . . . which correspond to the successive ranges AB, BC, . . . of the desired function shown by the curve 5. The alternate contacts $A'$, $C'$, $E'$ and $G'$ on the resistor 6 are connected to earth, and similarly the alternate contacts $B''$, $D''$ and $F''$ of resistor 7 (intermediate the earthed contacts of resistor 6) are connected to earth. The remaining contacts on the two resistors are connected through selected resistors 9 to a supply line 10, the resistors being so chosen that a potential at the contact represents substantially, that is to say at least approximately, the ordinate of the corresponding point on the curve; for example the contact $B'$ is connected to the supply line through a resistor 9 of such value that the potential at contact $B'$ represents in magnitude the ordinate of point B on the curve. Similarly the potentials at contacts $D'$ and $F'$ on resistor 6 represent the ordinates at D and F, and those at contacts $A''$, $C''$, $E''$ and $G''$ on resistor 7 represent the ordinates at A, C, E and G on the curve.

The wipers 11 and 12 of these two potentiometers are driven in unison by a motor 13 and are so arranged that they pass over corresponding contacts simultaneously. The position of these wipers represents at any moment the prevailing value of the variable, and they are connected to an amplifier 14 in which the outputs of the potentiometers are summed. Any resistors in the amplifier which are effectively in parallel with those portions of the function-generating potentiometer which are in use can be given a high value to avoid unintentional distortion of the straight-line approximation to the desired output function.

The voltage output of potentiometer 6 is shown by the dash line $x_0$—B—$x_2$—D—$x_4$—F—$x_6$, and that of potentiometer 7 by the dotted line A—$x_1$—C—$x_3$—E—$x_5$—G. The sum of these two voltages is given by the chain-dotted line A—B—C—D—E—F—G. It will be seen that this is a close approximation to the original curve and the approximation can be made closer by providing more contact points on the potentiometers.

Frequently in analogue computers, it is found necessary to modify the original function after the function-generating apparatus has been constructed. This can be effected very easily with apparatus constructed in accordance with the invention. As an example, if it is desired to make the curve of the function more concave between points D and F, it is only necessary to increase the value of the resistor 9 between point E and the supply line. The remainder of the curve will be unaffected. This is because each of the contacts A–G of the resistors 6 and 7 which are connected to the supply line are effectively isolated from each other by the adjacent earthed contacts.

Uniformly-wound drum-type resistive potentiometers may be used for the potentiometers 6 and 7 and it will be understood that such potentiometers can be more easily and more economically produced than contoured potentiometers.

It should be noted that it is not essential that the contacts on a potentiometer should be equally spaced. As however it is essential that the wipers of the potentiometers reach corresponding contacts simultaneously, the spacing of the contacts of the two potentiometers should follow the same pattern.

Figure 3:
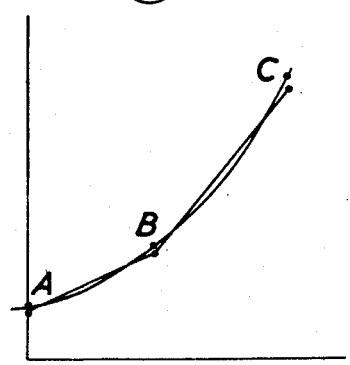
Figs. 3 and 4 are graphs illustrating methods of obtaining closer approximations to the desired output function.

As shown in Figure 3, a closer approximation to the curve of the desired output function between two points A and B can be obtained by applying, to points $A''$ and $B'$ on the potentiometers, potentials representing values slightly less (when the curve is concave) than the values of the ordinates of the points A and B. If the curve is convex between these two points, the potentials are chosen to represent values slightly greater than the values of the corresponding ordinates.

Figure 4:
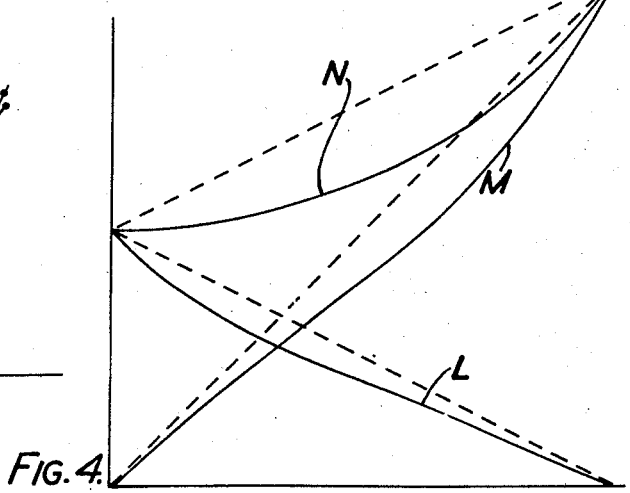

When the function to be approximated has a progressively increasing slope over the major part of its range, as for instance the function $y=x^2$, the approximation to the function can often be improved by judicious selection of the load across the output of the potentiometers. For example, the effect of using a load resistor of a value which is not high in comparison with the resistance of the potentiometer sections used to generate the straight-line approximation is shown by the curves L, M and N in Figure 4. Curved lines L and M represent the outputs of the two wipers in travelling over one section of their respective potentiometers, while curved line N represents the sum of these outputs. The corresponding output functions with an infinite load are shown by the straight lines. For the sake of clarity, the amount of distortion has been made greatly in excess of that which would usually be necessary. As a load across the potentiometer outputs will affect all sections of the potentiometers, it is necessary to make a compromise in choosing the value of the load.

If the function to be approximated is positive over part of its range and negative over another part of the range, it may sometimes be convenient to generate a voltage function which is always positive (or negative) and which represents the sum of the desired approximation and a constant voltage, and finally to subtract the constant voltage, thereby obtaining the desired approximation. In other cases, it may be desirable to generate a function which is related to the required function, the difference being produced by known means.

Although in general it is probably more convenient to employ resistive potentiometers, it is to be understood that inductive or capacitative potentiometers might be adopted.

What I claim is:

1. Apparatus for generating electrical quantities which vary as a desired function of a mechanically represented variable, comprising a plurality of linear potentiometers having spaced connection points, a wiper movable over each said potentiometer, all said wipers being moved together as such mechanically represented variable and traversing corresponding connection points of all the potentiometers simultaneously, exchangeable means to apply a pre-determined selected potential to a connection point of one potentiometer, exchangeable means to apply a different predetermined potential to a different connection point of another potentiometer, means to apply a fixed reference potential to said first potentiometer at a point corresponding to the application of the said different selected potential to the said other potentiometer, and to said other potentiometer at a point corresponding to the application of the said first selected potential to the first potentiometer, and summing means for adding the potentials derived from the said wipers.

2. Apparatus for generating electrical quantities which vary as a desired function of a mechanically represented variable, comprising two linear potentiometers, a plurality of spaced connection points on each potentiometer, a wiper movable over each potentiometer, means to move both said wipers simultaneously in accordance with said variable and traversing connection points of the two potentiometers simultaneously, means to apply different selected potentials to alternate connection points of one potentiometer, means to apply different selected potentials to respectively different corresponding alternate connection points of the other potentiometer, means to apply a reference potential to the connection points of both potentiometers not connected to said selected potentials, all said potentials selected to represent successive different datum values of the desired function, and summing means fed by said wipers to deliver an output potential which varies as the desired function when the wipers are moved, said potential traversing the datum values with a progressive transition between such datum values.

3. Apparatus according to claim 2 wherein the different selected potentials are derived from potential supply means by impedance elements, said elements being adapted to be exchanged to suit the apparatus for required output functions.

4. Apparatus according to claim 3 wherein all said selected potentials are of the same sign or polarity relatively to the reference potential.

5. Apparatus according to claim 3 wherein all said selected potentials are derived from a single source of potential.

References Cited in the file of this patent

UNITED STATES PATENTS

| | | |
|---|---|---|
| 2,404,387 | Lovell et al. | July 23, 1946 |
| 2,686,099 | Bomberger et al. | Aug. 10, 1954 |
| 2,688,442 | Droz et al. | Sept. 7, 1954 |

OTHER REFERENCES

Korn: Design and Construction of Universal Function Generating Potentiometers, The Review of Scientific Instruments, vol. 21, No. 1, January 1950, pages 77–81.

Generating Nonlinear Functions With Linear Potentiometers (Levenstein), Tele-Tech and Electronic Industries, October 1953, page 76.